(12) United States Patent
Kim et al.

(10) Patent No.: US 7,594,274 B2
(45) Date of Patent: Sep. 22, 2009

(54) METHOD OF AUTHENTICATING AN APPLICATION FOR PERSONAL DIGITAL ASSISTANT USING A UNIQUE ID BASED ON A PERSONAL COMPUTER AND SYSTEM USING THEREOF

(75) Inventors: Jong-Won Kim, Daejeon-si (KR); Jong-Uk Choi, Seoul (KR); Byung-Keun Jeon, Seoul (KR)

(73) Assignee: Markany, Inc., Seoul (KR)

( * ) Notice: Subject to any disclaimer, the term of this patent is extended or adjusted under 35 U.S.C. 154(b) by 474 days.

(21) Appl. No.: 10/374,929

(22) Filed: Feb. 25, 2003

(65) Prior Publication Data

US 2004/0243821 A1 Dec. 2, 2004

(30) Foreign Application Priority Data

Feb. 25, 2002 (KR) .................. 10-2002-0009994

(51) Int. Cl.
*G06F 21/00* (2006.01)
(52) U.S. Cl. ................ 726/26; 726/2; 726/29; 713/158; 713/169; 380/247; 705/56; 705/57
(58) Field of Classification Search .......... 726/29, 726/26, 2; 705/56, 57; 713/158, 169; 380/247
See application file for complete search history.

(56) References Cited

U.S. PATENT DOCUMENTS 5,666,411 A * 9/1997 McCarty ................. 705/51
5,923,754 A * 7/1999 Angelo et al. ............ 705/54
5,933,497 A * 8/1999 Beetcher et al. .......... 705/59
6,411,941 B1 * 6/2002 Mullor et al. ............ 705/51
6,832,319 B1 * 12/2004 Bell et al. ............... 713/193
6,857,067 B2 * 2/2005 Edelman .................. 713/155
6,892,301 B1 * 5/2005 Hansmann et al. ........ 713/172
7,016,496 B2 * 3/2006 Koch ...................... 380/239
2002/0010863 A1 * 1/2002 Mankefors ............... 713/189
2002/0029199 A1 * 3/2002 Go et al. ................. 705/51
2002/0077977 A1 * 6/2002 Neely et al. .............. 705/40
2002/0078367 A1 * 6/2002 Lang et al. ............... 713/200
2002/0116632 A1 * 8/2002 Itoh et al. ................. 713/200
2004/0015694 A1 * 1/2004 DeTreville ............... 713/172

FOREIGN PATENT DOCUMENTS

KR  10-2001-0099412 A  11/2001
KR  10-2001-0106325 A  11/2001
KR  10-2002-0083851 A  11/2002

\* cited by examiner

*Primary Examiner*—Carl Colin
(74) *Attorney, Agent, or Firm*—Blakely, Sokoloff, Taylor & Zafman LLP

(57) ABSTRACT

By using a unique ID generated by considering the hardware characteristic of PC in PDA where an application program, etc. distributed based on PC is installed, it makes possible to generate and authenticate a virtual unique ID in PDA so as to authenticate drive of the application in PDA. As such, the file size of a distributed edition is small in its characteristic and it is difficult to have a protecting means such as security, etc. in view of the characteristic of device. Hence, illegal distribution is easy and a more certain solution is provided so as to prevent illegal copy of the application in PDA having a feasible characteristic in protecting copyright.

10 Claims, 10 Drawing Sheets

METHOD OF AUTHENTICATING AN APPLICATION FOR PERSONAL DIGITAL ASSISTANT USING A UNIQUE ID BASED ON A PERSONAL COMPUTER AND SYSTEM USING THEREOF

CROSS-REFERENCE TO OTHER APPLICATIONS

This Application claims priority from Korean Patent Application No. 2002-9994, filed on Feb. 25, 2002.

FIELD OF INVENTION

The present invention relates to a method of authenticating work, an application, performed on a PDA (personal digital assistant) and system using thereof, more particularly, to an authentication method and system using thereof for generating a virtual unique ID in a PDA by using a unique ID obtained from hardware information of PC and performing to authenticate an application based on the fact that an application is installed via PC.

BACKGROUND OF INVENTION

PDA is terminal having portability not available from PC (personal computer), usage irrespective of place, and assistant role-play of personal information management, providing a more user-friendly computer environment through its small size, convenient portability, and interoperability with PC and thus its range of usage getting expanded.

PDA constitutes ROM (read only memory) with a basic program embedded for its own drive, flash memory for driving an operating system, RAM (read access memory) driving an application and performing the role of storage media, liquid crystal display for showing the proceeding status of an application, and input/output terminal for inputting/outputting the external of application and data, and the like. The operating system is usually loaded in the flash memory.

Such PDA substitutes for the function of an existing paper diary or electronic note and enables to e-mail or reserve appointment time, alarm, etc. by various interoperability means. Further, it is possible to install and execute a variety of programs being employed in PC. PDA is securing its position as an information-oriented solution device for corporate plus role-playing as a wireless Internet assistant device such as email and web browsing.

Likewise PC, a variety of applications for PDA now are selling according to the operating system and central processing unit (CPU). However, PDA applications are usually small in size, and weak in illegal distribution in view of its own structure. In the case of using a general encoding method or authentication procedure being used in a PC DP, since storage capacity and memory used are extremely restricted and performance speed also goes down, it is difficult to perform encoding or authentication normally. Besides, since each serial number of PDA cannot be recognized and the type and operating system of PDA are not unified, the encoding module or authentication procedure available in PDA in a real time is extremely restricted.

In particular, owing to the development of Internet there are various opportunities to obtain applications (digital contents having various types including application), whereas a demand for protection technology for applications rapidly grows due to easy duplicate and circulation. Hence, as an alternative, digital rights management (DRM) of protecting, securing, and managing the digital contents, that is, technology of preventing illegal use of the digital contents being circulated, continuing to protect and manage right and profit of copyright holders and license holders which are originated from a use of the protected digital contents, and technology in service area are under development.

The applicant suggested a variety of ways to protect right of the copyright holders for their works through Internet in the form of on-line as well as off-line, which have been filed as several patent applications including Korean Patent Application No. 2001-23562. However, the above ways of protection are mostly focused on the digital contents based on PC.

However, recently the digital contents are provided or used through PC as well as the digital contents in various types of text, music, image, software, etc. are provided by means of a personal digital assistant, PDA. Differently from such current, a specific method of protecting an application being performed in PDA is insufficient and a couple of methods are recently suggested.

Of these methods, a method of protecting applications being performed in PDA is disclosed in Korean Patent Laid-Open No. 2001-99412 (entitled: software distribution system for PDA) as illustrated in FIG. 1. The above prior art illustrated in FIG. 1 saves a program (10a) to be executed in the PDA (20) in a separate removable memory card (10) simultaneously with saving an authentication data key in the memory card (10) so as to prevent it from being copied to other medium before transmitting an authentication key to authenticating server (50) on Internet in the PDA (20). It discloses a method of transmitting an install key disabling the locking state of the application stored in the memory card (10) from the authenticating server (50) to PDA (20) and thus employing the application (10a) of the memory card (10), in the case that the authentication key is authenticated by examining its integrity in the authenticating server.

However, in the above prior art, a memory card should be used inconveniently in order to install application and a hardware-like port or interface to which a memory card is connected externally should be separately required, whereby the expenses are considerably increased and it is inconvenient in installing software and upgrading, taking into consideration that software are recently distributed through Internet.

In order to improve the problem of using a separate memory card as described above, Korean Patent Laid-Open No. 2001-106325 (entitled: method and system for providing e-book contents service for wireless PDA having function of user authentication for digital copyright management service), as illustrated in FIG. 2, discloses that e-book contents are downloaded through communications between PDA (20) and authenticating server (50) and the e-book contents selected by using an authentication key corresponding to the user registration information are decoded in the PDA (20) so as to be used only by a particular user, thereby preventing e-book contents from being illegally circulated.

However, the operating speed of PDA is too slow in applying to the above technology of encoding the digital contents, e-book, and decoding it during the execution of a specific application so as to read the corresponding e-book. And since PDA generally executes in a storage area, it is very difficult to apply to such technology due to its operating system. Further, the authentication key is generated and managed based on the user's PDA information where the PDA information indicates PDA system information such as CPU size of PDA, memory size, etc. Hence, it is difficult to substantially regard it as unique information to specify PDA. That is, if the number of PDA user connecting to an authenticating server increases, it could be difficult to regard the authentication key as a unique key having unique characteristic based on users.

These are related to PDA's own basic problem, and the above prior art has a problem of failing to exactly recognize the characteristic of PDA.

SUMMARY OF THE INVENTION

In order to solve the problem of the prior art above mentioned, it is essential to apply a software method instead of a hardware method taking into consideration that it is difficult to apply Key-Lock (technology of preventing illegal copy which connects to a parallel port or USB port), a hardware method being used in PC so as to prevent an application, etc. from being illegally copied, and PDA has insufficient external port connectable to an external connecting device in view of hardware characteristics.

Accordingly, the present invention is considering a method applying to PDA in a software manner as a method to authenticate the application being used in PDA. The basic principle of the technology to be applied in the present invention is that if an application for PDA calls API (Application Program Interface) which checks an authentication module, it receives, inspects, and executes the API authentication module, and thus in case of the authentication module (corresponding to Key-lock in a hardware area) not existing or being damaged (regarded as cracking), the application is ended to reduce illegal use.

Further, since authentication module is encoded as information, the virtual unique ID of PDA, a copy of the authentication module does not result in its decoding and thus making illegal copy impossible. In this regard, since PDA itself is unable to frequently generate the virtual unique ID, it receives the virtual unique ID from the PC having more abundant resources to use, which is the core technology of the present invention.

The object of the present invention is to provide an authentication method for protecting illegal copy and distribution of the application of PDA and management system therefor.

The another object of the present invention is to provide a method of authenticating the copyrighted works of PDA using unique ID based on PC so as to prevent illegal copy and deformation for protecting copyright of application and system using thereof The another object of the present invention is to provide a method of producing authentication module required by the application of PDA and system using thereof.

DETAILED DESCRIPTION OF A PREFERRED EMBODIMENT

Figure 1:
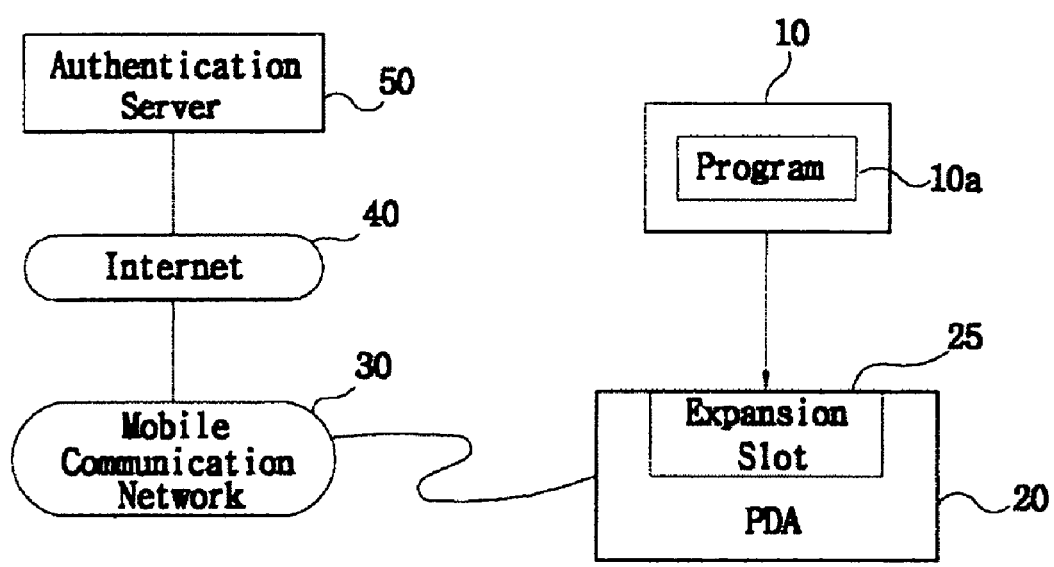
FIG. 1 is a diagram illustrating an example of method of authenticating an application for a conventional PDA.
Figure 2:
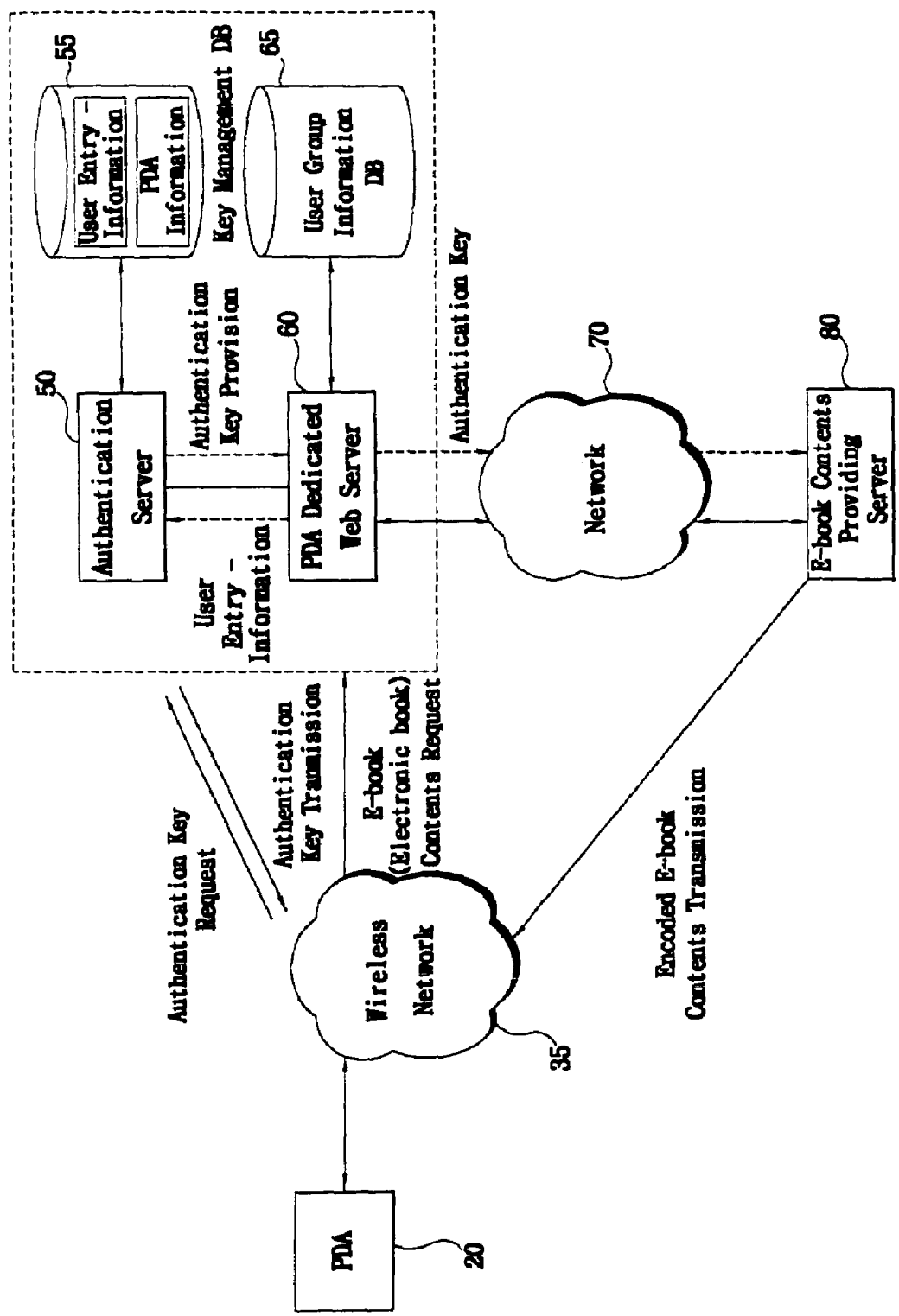
FIG. 2 is a diagram illustrating another example of method of authenticating a system for copyright management of a conventional PDA.

In order to complete the above objects, the present invention relates to a method for authenticating application performed on personal digital assistant (PDA), wherein said applications are installed in said personal digital assistant via personal computer, and the authentication of said application is achieved by using virtual unique ID generated from information which indicates unique hardware characteristics of the personal computer.

The present invention further relates to a method for authenticating applications, said applications are transmitted to personal digital assistants (user PDA portion) via user's personal computer (user PC portion) and then performed thereon, and registration information of said applications are registered and managed at server unit connected via internet, the method comprising: a first step of determining whether an authentication module for authenticating said applications installed in the PDA portion is installed when said applications are performed; a second step of decoding said authentication module with virtual unique ID in case that the authentication module has been installed at the first step; and a third step of authenticating said applications by determining whether information included in the decoded authentication module is decoded correctly; wherein said virtual unique ID uses an unique ID which is transmitted from the user PDA portion, and said unique ID is generated from information indicating hardware characteristics of the user PC portion which is able to specify the user PC portion.

The present invention further relates to a system for authenticating applications of PDA, said applications are transmitted to personal digital assistants (user PDA portion) via user's personal computer (user PC portion) and then performed thereon, and registration information of said applications are registered and managed at server unit connected via internet, wherein said user PC portion comprises: unique ID generation means for generating unique ID from information indicating hardware characteristics to specify the user PC portion; and communication means for performing the unique ID transmission to the user PDA portion and data transmission between the server unit and the user PDA portion, and said server unit comprises: virtual unique ID management means for managing virtual unique ID and user information of the PDA portion at which the applications are performed; authentication module generation means for generating an authentication module; and authentication module encoding means for encoding the authentication module with virtual unique ID, and said user PDA portion comprises: interface means for performing data communication between user PC portion and the server unit; virtual unique ID generation means for generating virtual unique ID for user PDA portion from the unique ID received from the user PC portion via the interface means; and ID determination means for determining the authenticity of said applications by using information obtained from decoding said encoded authentication module with the virtual unique ID.

There is a negative method such as a serial number input for the corresponding application like in PC other than the above methods. However, by applying it to PDA in a positive manner, the present invention connects protection means like a serial number input to a virtual unique ID of PDA itself and thus making a more powerful technology of preventing copy possible.

For instance, anyone can install and use an application only having its serial number if the serial number is used by stealth. However, in case of using a virtual unique ID, other devices cannot use once installed serial number again. Hence, other user illegally cannot use the right of using the application permitted on its serial number. Further, in the case that user having the right of using an application assigns and converts it to other PDA, assignment is possible even though information of the right of use is cleared from the unique ID database of the server portion, thereby making assignment of serial number and conversion thereof to other device possible.

Although the preferred embodiments described below according to the present invention are disclosed for illustrative purposes, it will be obvious to those skilled in the art that such embodiments are merely for illustrations but are not restricted to the illustrations themselves, and can be variously changed, transformed and replaced within the scope of the technical idea of the present invention.

Hereinbelow, the preferred embodiments according to the present invention are explained in detail with reference to the drawings attached hereto.

Figure 3:
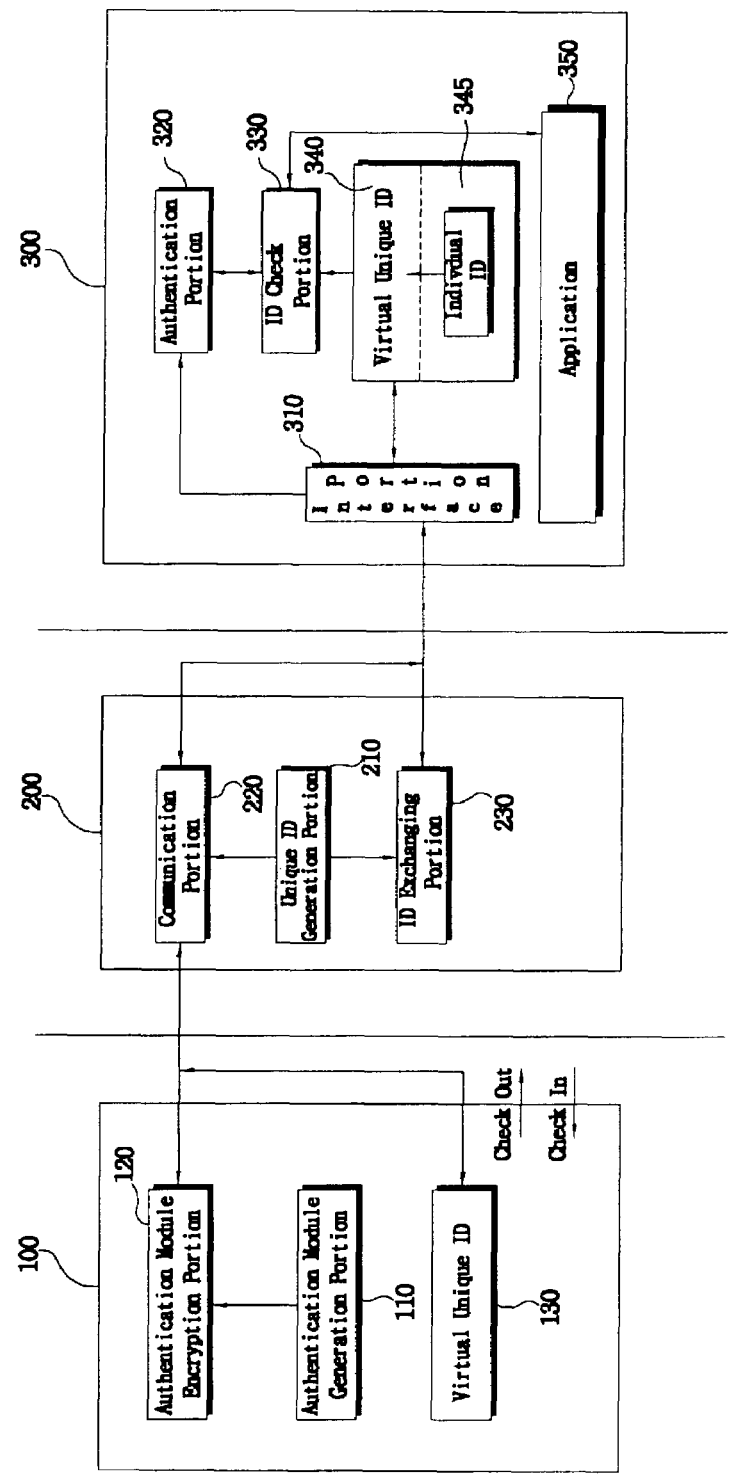
FIG. 3 is a block diagram illustrating the schematic architecture of system for authenticating an application for a PDA using a virtual unique ID based on a PC according to the present invention.

FIG. 3 is a block diagram illustrating the schematic constitution of system for authenticating an application for PDA using a virtual unique ID based on PC according to the present invention. The constitution of the authentication system according to the present invention of FIG. 3 is largely divided into three portions based on function comprising: a server portion (100) performing to prepare and distribute an authentication module to decide whether an application is performed and manage information of application user; a user PC portion (200) generating a unique ID which is a basis for generating a virtual unique ID and bridging between the server portion (100) and the user PDA portion (300) where a substantial application is performed; a user PDA portion (300) performing authentication so as to operate application through the authentication module in the environment where PDA application is operated. The server portion (100), user PC portion (200), and user PDA portion (300) are explained by specifically classifying the constitution based on function.

The server portion (100) comprises an authentication module-generating portion (110) to perform preparation and distribution of the authentication module. The authentication module generated from such authentication module generating portion (110) comprises the characteristic information of the user PDA portion (300) and user PC portion (200), which detects a transmission error generated in a process of transmitting data by using CRC (Cyclic Redundancy Checking) and verifies whether there is information damaged by means of history of the user PDA portion (300) stored in the server portion (100) and the user PC portion (200) so as to determine correction and damage (for example, as a hacking method, it is a method of inducing to experience a fake authentication process by deceiving the IP of server and is to check whether it is a normal server or not) of the server portion (100).

The authentication module-encoding portion (120) receives a virtual unique ID of the user PDA portion (300) from the virtual unique ID managing portion (130) and encodes the authentication module generated in the authentication module-generating portion (110) as the virtual unique ID and transmits it to the user PC portion (200).

The virtual unique ID managing portion (130) maintains and manages a virtual unique ID and user information (a serial number capable of identifying each user, etc.) uploaded from the user PDA portion (300). The virtual unique ID managing portion (130) transfers a program to other device regarding the application (350) installed in the user PDA portion (300) or deletes the unique ID so as to assign the right of use, etc. (referred to as Check Out in the present invention) and registers the unique ID in the user information (referred to as Check In in the present invention). The Check Out can be requested only in PDA portion (300) as Check In. As such, the right of using the program can be assigned, which can be handled with the program without operator's intervention.

The user PC portion (200) comprises a unique ID generating portion (210) generating a unique ID, a communication portion (220) bridging to deliver information between the server portion (100) and the user PDA portion (300), an ID exchanging portion (230) exchanging a unique ID with the user PDA portion (300), taking into consideration of the hardware characteristic of user PC. The user PC portion (200), in addition to a general function performed in PC, functions to bridge the server portion (100) and user PDA portion (300) and functions to prepare resource for generating a virtual unique ID so as to compensate the structure not having a unique ID as the user PDA portion (300) does not mostly have its own hardware characteristic.

To this effect, the user PC portion (200) is responsible for a buffer for transferring information and application between the server portion (100) and the user PDA portion (300) each other in the present system and protecting a server from a user's operation through the user PDA portion (300). It further provides information for generating a virtual unique ID in the user PDA portion (300).

The unique ID generating portion (210) of the user PC portion (200) corresponds to a software module to be used by generating a unique ID characterizing a user PC and converting it to a virtual unique ID in the user PDA portion (300) by means of information discriminated from other hardware such as the hardware resources of the user PC portion (200), processor, LAN card, hard disk (HDD), memory chip and so on.

The user PDA portion (300) is able to receive an authentication module through a direct communication with the server portion (100) in the case that a basic program such as interface module is substantially installed in the user PDA portion (300). However, since a direct connection is not usually easy, it connects to the server portion (100) through the communication portion (220) installed in the PC portion (200). Hence, the communication portion (220) performs such communication-related operation.

The ID exchanging portion (230) which is employed for supporting a virtual ID in the user PDA portion (300) incapable of generating its own unique ID transfers the unique ID generated by the unique ID generating portion (210) of the user PC portion (200) to the user PDA portion (300). The ID exchanging portion (230), although separately explained to subdivide the motion in the user PC portion (200) based on function, is included in the communication portion (220) and receives the unique ID generated in the unique ID generating portion (210) from the communication portion (220) and transfers it to the user PDA portion (300).

The user PDA portion (300) comprises an interface portion (310) connecting the user PC portion (200) and the server portion (100), an authentication module portion (320) including an authentication module as generated and transmitted from the server portion (100), an ID checking portion (330) checking ID, a virtual unique ID generating portion (340), and an application (350). The user PDA portion (300) corresponds to the system area to perform authentication so as to operate the application (350) through an authentication module in the environment where the application (350) is operated.

The user PDA portion (300) does not consider security in view of the characteristics of hardware and software employed, and not have resource to generate the unique ID (345) by a method of usually generating ID as a hardware portion of the system does not include information of a manufacturing company in a chip or hardware unlike PC. Hence, the user PC portion (200) temporarily generates a unique ID and receives it to the virtual unique ID generating portion (340) of the user PDA portion (300) through the ID exchanging portion (230) and converts it to the virtual unique ID to use. At this time, the conversion of a unique ID in PC to the virtual unique ID of the user PDA portion (300), since there is a difference in the system being employed in the user PC portion (200) and the user PDA portion (300) thereby causing difference in view of the formal terms such as ID formatting or its length, indicates a process of making such difference conform to the corresponding system. Although a conversion in a simple form is mentioned above, a particular encoding or predetermined modification in the corresponding system can be performed as it is decided.

The interface portion (310) of the user PDA portion (300) is in charge of communication between the server portion (100) and user PC portion (200) and a virtual ID exchange with the ID exchanging portion (230), performs to collect unique ID information of the user PC portion (200) necessary for generating a virtual unique ID and communicate with the server portion (100) or the communication portion (220) of the user PC portion (200) so as to receive the encoded authentication module.

The authentication module of the authentication module portion (320) which is a module made in the server portion (100) by using each virtual unique ID of PDA is executed only for the authenticated application by inspecting the unique ID of user in the ID checking portion (330) in authenticating application in the system of the present invention.

The ID checking portion (330) performs authentication for the authentication module portion (320) by the virtual unique ID of the user PDA portion (300) itself, which makes it possible to perform the authentication of the application (350). When requiring the authentication in the absence of the authentication module, it informs user of absence of the authentication module and requires receiving the authentication module.

The virtual unique ID generating portion (340) which is concept similar to the virtual ID generating portion (210) of PC prepares a virtual unique ID to use by means of a virtual ID of PC as there are many cases where PDA is not able to generate its own virtual ID (345) differently from PC.

The application (350) which is an execution program produced by an application manufacturing company comprises a module to verify whether PDA is authenticated by the ID checking portion, (330) and the authentication module portion (320).

Figure 4:
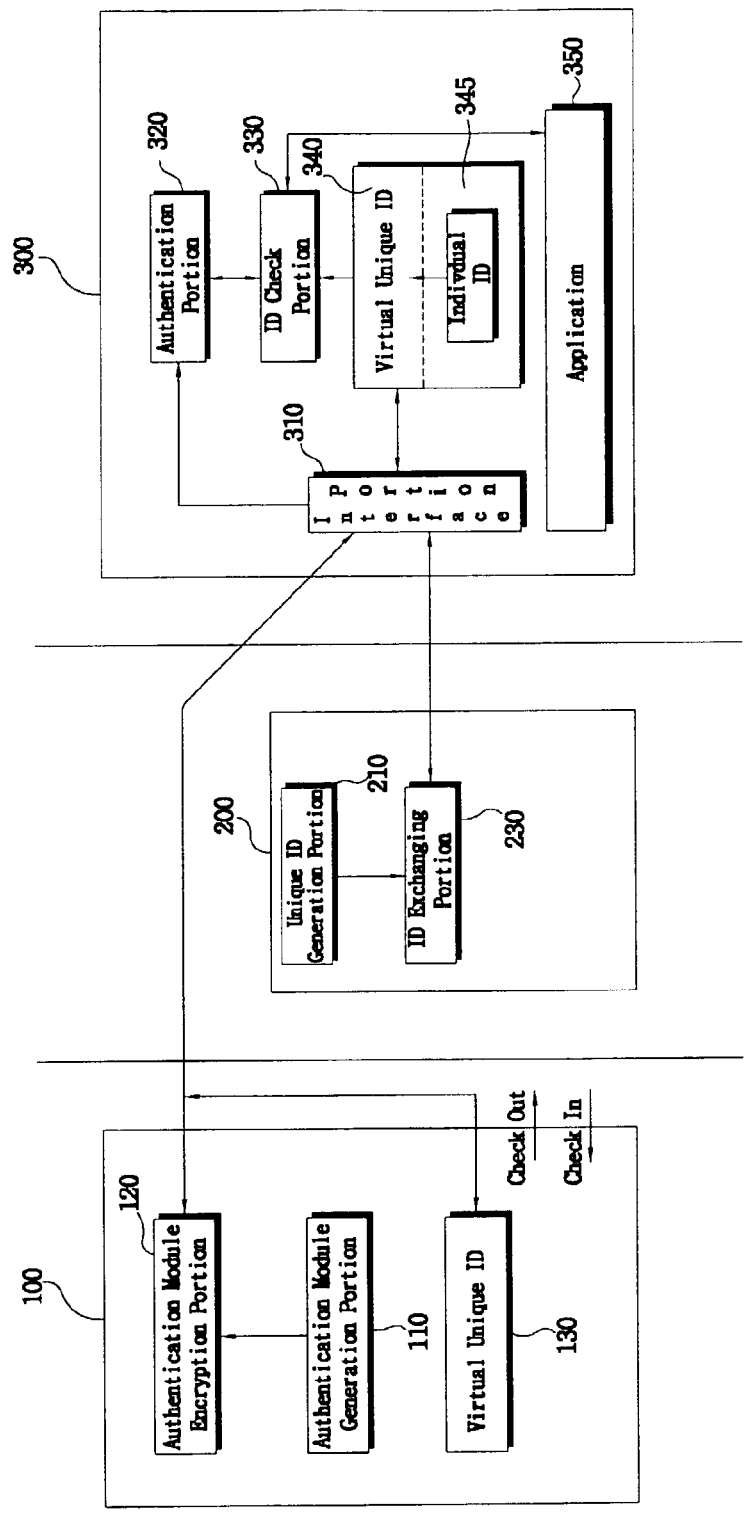
FIG. 4 is a block diagram illustrating another embodiment of system for authenticating an application for a PDA using a virtual unique ID based on a PC according to the present invention.

FIG. 4 is a block diagram illustrating another embodiment of system for authenticating an application for PDA using a virtual unique ID based on PC according to the present invention.

Differently from the authentication method in the system illustrated in FIG. 3, the authentication method of FIG. 4 is a direct authentication method, that is, a method that the user PDA portion (300) from the server portion (100) directly receives an authentication module from the authentication module generating portion (110) in the environment where the user PDA portion (300) directly connects to Internet. That is, it receives authentication directly by connecting to the server portion (100) by means of the network connecting means of the user PDA portion (300).

Referring to FIG. 4, it directly connects to the server portion (100) through the interface portion (310) of the user PDA portion (300) and thus receives an authentication module from the authentication module-encoding portion (120). Only, the system of the unique ID (345) can be operated in the case that the virtual unique ID (340) must be prepared inside of the PDA portion (300) through the related ID checking portion (330). To be specific, it is a virtual unique ID-based method and thus the system cannot be operated without a virtual unique ID, thereby its preparation in advance is required for a normal operation.

The interface portion (310) communicates with the authentication module-encoding portion (120) of the server portion (100) in wireless and protects the authentication module from cracking, etc. generated during the communication (in case of cracking, it intercepts the communication and uses the information to break security). The operation is mostly identical to the authentication method of FIG. 3 and there is a difference only in that the interface portion (310) comprises additionally function to operate with the server portion (100).

The interface portion (310) informs the server portion (100) of the subject to request the operation and authentication of the communication portion (220) in FIG. 3 is not the user PC portion (200) but the user PDA portion (300) and conforms the interface relating to the communication to the user PDA portion (300) to transmit the authentication module generated in the authentication module generating portion (110) to the user PDA portion (300).

The function of other constituents is the same as explained referring to FIG. 3 and thus its explanation is left out.

The entire process of operation of the system having the above constitution, i.e., a process of installing and authenticating an application in the PDA portion (300) is more concretely explained referring to FIGS. 5~10.

Figure 5:
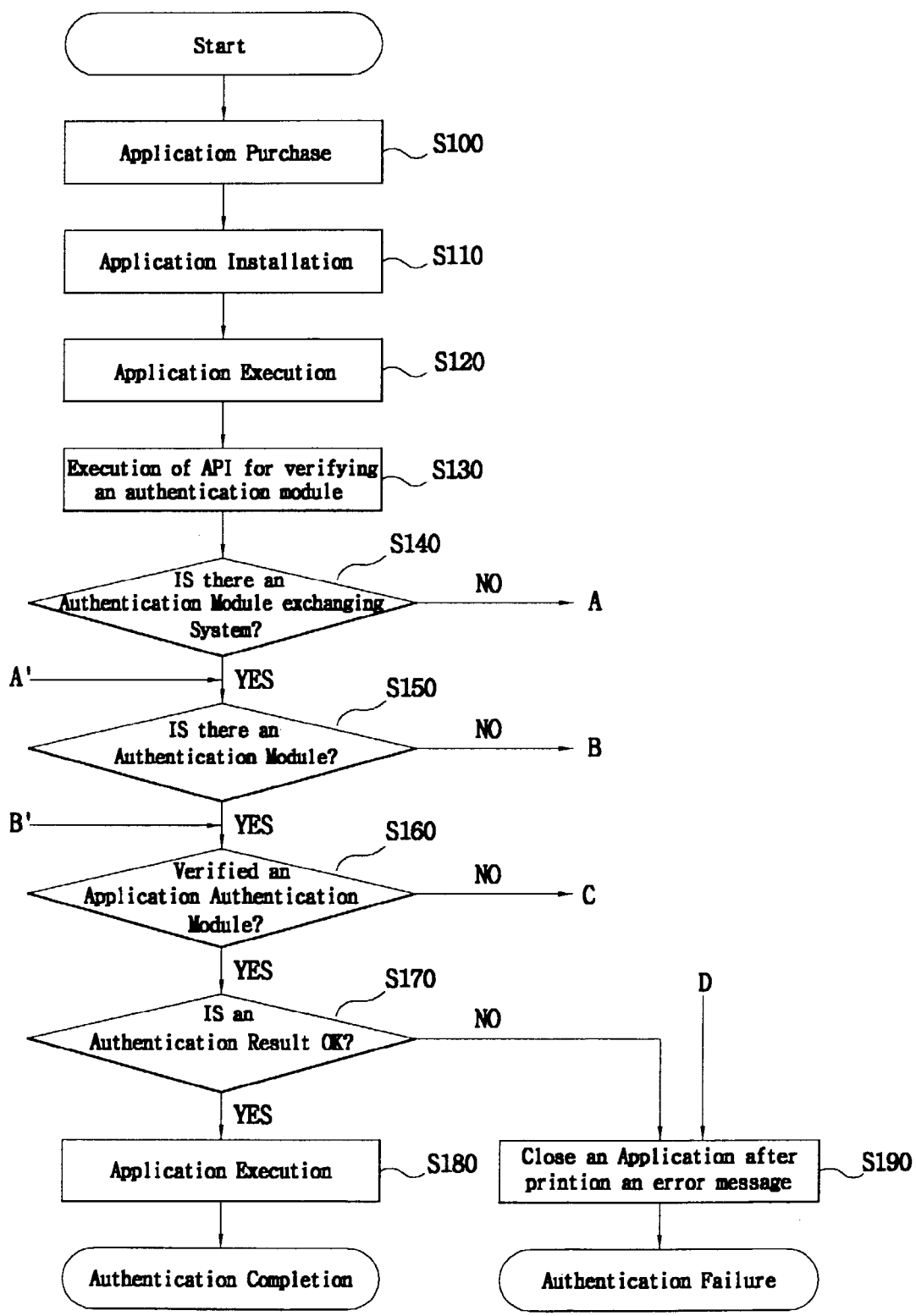
FIG. 5 is a flow chart illustrating the entire process from installation of an application to authentication thereof in the PDA according to the present invention.

FIG. 5 is a flow chart illustrating the entire process from installation of an application for PDA to authentication thereof according to the present invention. As illustrated in FIG. 5, user purchases application that will be installed in the user PDA portion (300) by means of a usual purchasing way, i.e., an on-line store such as web or a general off-line store (Step 100).

The application purchased is installed in the PDA portion (300). An installing method is to copy it to the user PDA portion (300) through the user PC portion (200) using a storage medium such as CD, or to download an application on-line by means of Internet in the user PC portion (200) and copy it to the PDA portion (300) of PC and run an installation program according to a general installing method (Step 110).

The corresponding application is executed after installing the application (Step 120). The application includes an execution portion to perform the object and a functional portion to call the operating system in the primary portion and call API to automatically examine whether an authentication module exists or not, thereby executing API before executing the application (Step 130).

API, a command language set, which calls a specific command language when necessary for using a basic function of the operating system in the application, is called for examining whether an authentication module exists or not in the present invention.

As such, in the case where the authentication module (corresponding to Key-lock in a hardware place) does not exist or is damaged (regarded as Cracking) after receiving and authenticating the API authentication module, the application is ended to reduce illegal use.

As described above, API is executed to operate the interface portion (310) and thus verifying whether an authentication exchange system exists or not (Step 140). If there is no authentication module exchange system, it proceeds with A routine and experiences the process of FIG. 6. If there is an authentication module exchange system, it reverifies whether the user PDA portion (300) includes an authentication module (Step 150). At this time, in a case where the corresponding authentication module exists after verifying whether an authentication module exists or not, it proceeds with Step 160 to determine whether an authentication module for the application exists among these modules. In a case where the corresponding authentication module does not exist, it proceeds with B routine and experiences the process of FIG. 7.

Figure 8:
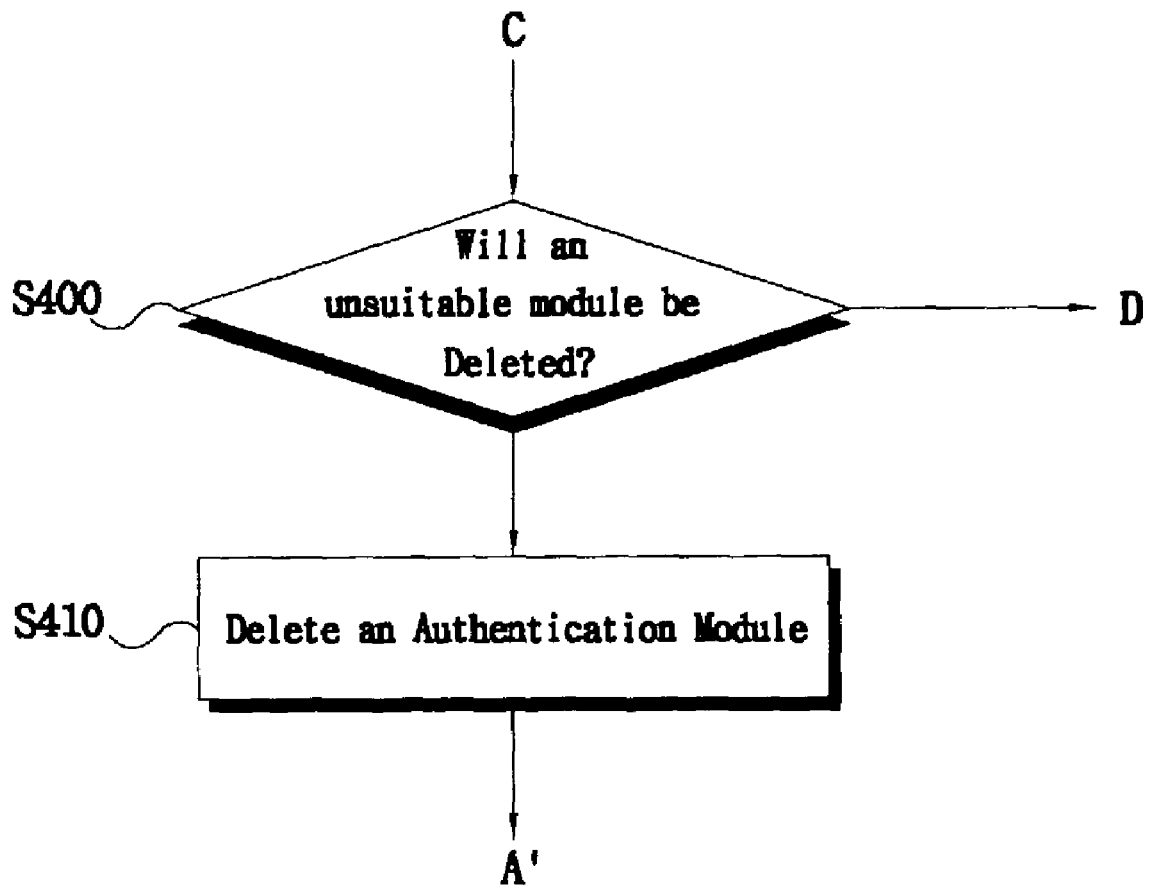
FIG. 8 is a flow chart illustrating a process of verifying an authentication module of the application in FIG. 5.

In the same manner, in the case that the application is not authenticated, it proceeds with C routine and experiences the process of FIG. 8. When it determines the above authentication result (Step 170), it proceeds with Step 180 to normally operate the application (350) of the user PDA portion (300). The authentication of the application of PDA is completed through the above process. However, in the case that as a result of verifying the authentication module for the corresponding application (350), it is not authenticated, an error message is output to end the application (Step 190).

Figure 6:
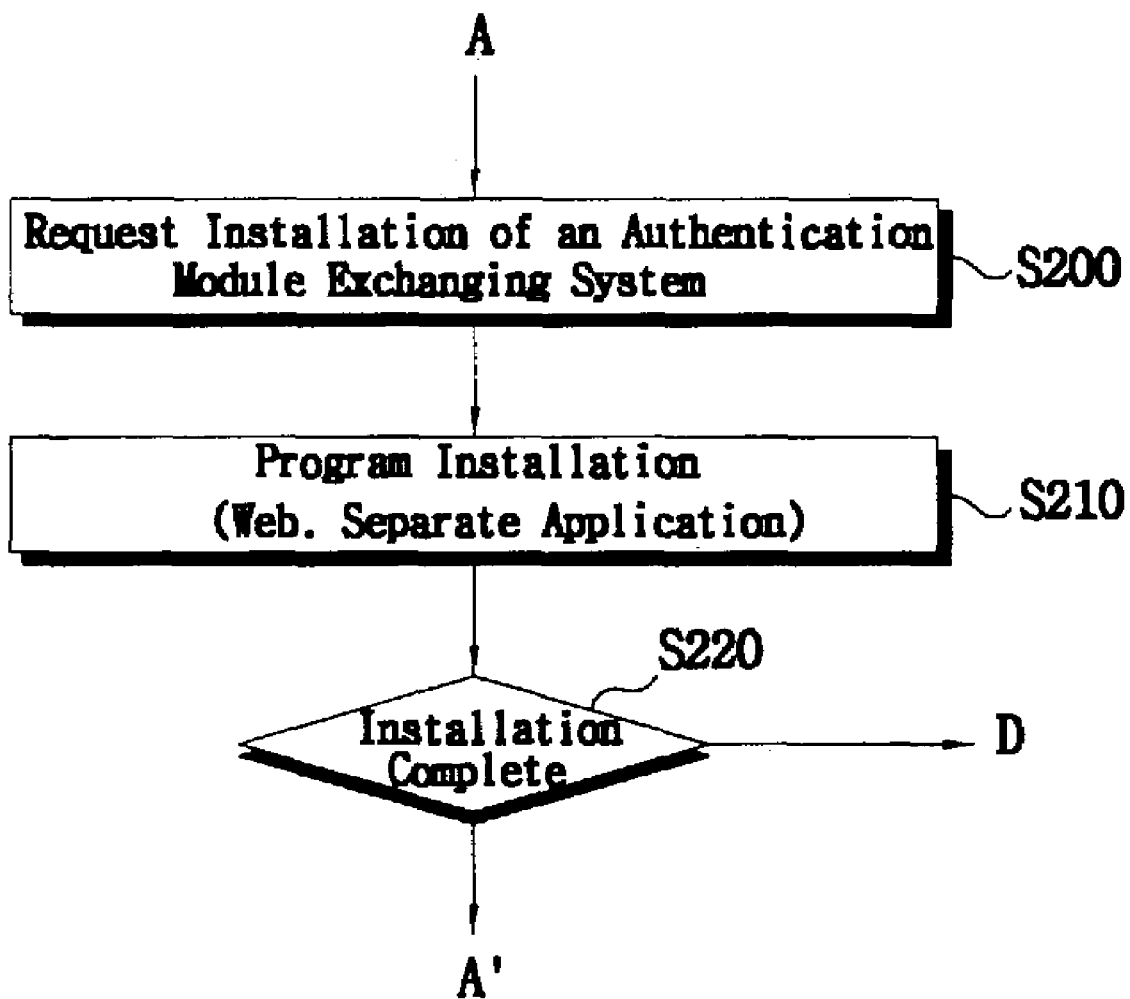
FIG. 6 is a flow chart illustrating a process of installing an authentication module exchange system in FIG. 5.
Figure 7:
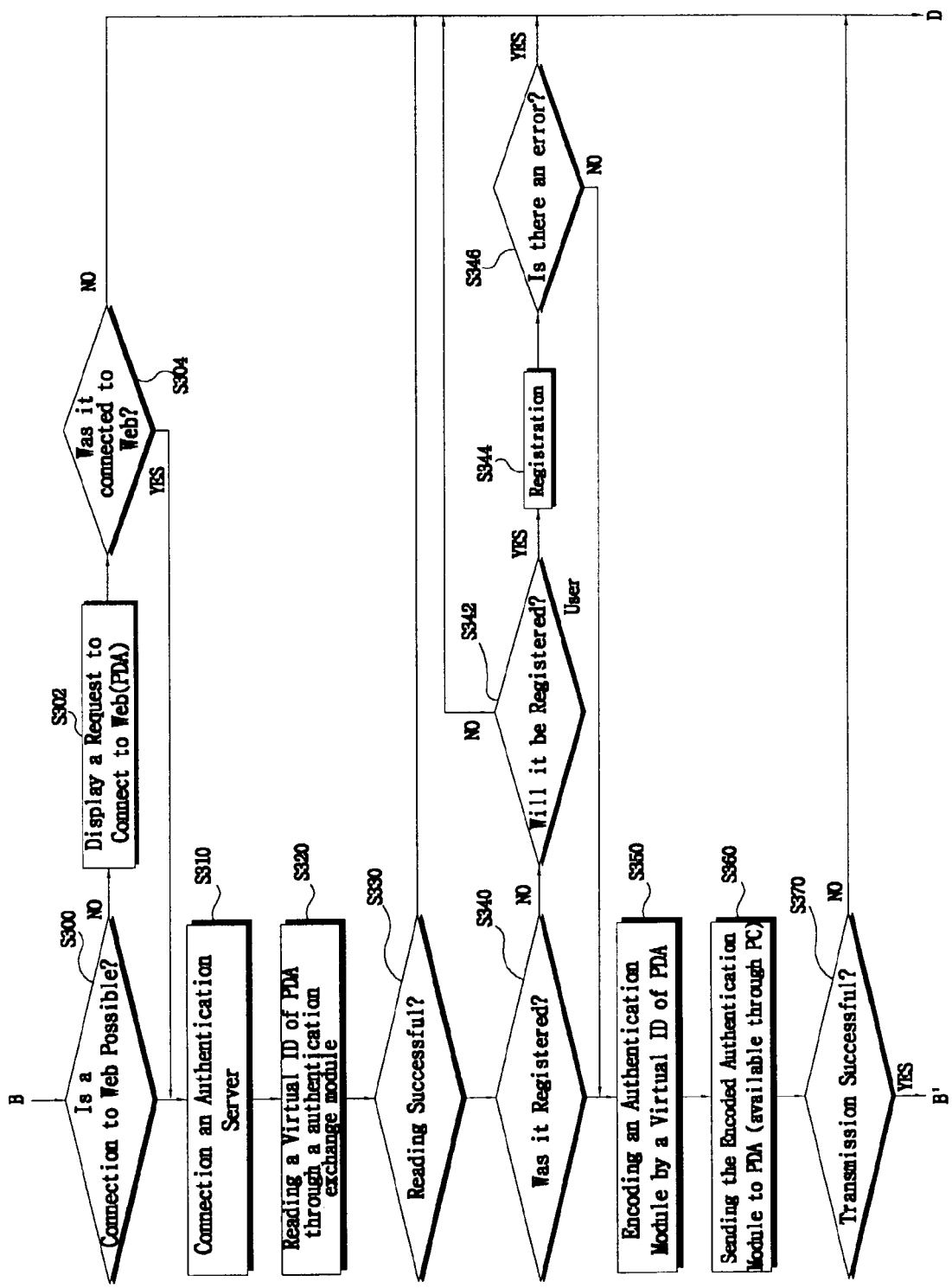
FIG. 7 is a flow chart illustrating a process of installing an authentication module in the user PDA portion.

In the case that it is not verified at the determination diverging point of each determination steps, Step140, Step150, and Step160 as mentioned above, it will experience the verification process illustrated in FIGS. 6, 7, and 8, respectively. If it is not authenticated or some problem happens even in such verification process, it proceeds with Step 190 and outputs an error message and ends the application, which is regarded as failure of the authentication operation.

Of the above authentication process, the process of installing authentication exchange system, verifying authentication module, and verifying authentication module of application are more concretely explained referring to FIG. 6 to FIG. 8.

FIG. 6 is a flow chart illustrating a process of installing an authentication module exchange system according to the present invention. In FIG. 5, in case of an authentication module exchange system not being installed in the interface portion (310), a message window asking for installing the authentication module exchange system is appeared on a screen (Step 200).

A program for installing the authentication module exchange system is to install the authentication module exchange system in the user PC portion (200) or the user PDA portion (300) according to user's choice (Step 210). In the case that user does not install the authentication module exchange system or an error generates during the installation by checking whether the authentication module exchange system is installed (Step 220), it proceeds with Step 190 of FIG. 5 and an error message outputs on the screen and the application (350) ends, thereby resulting in failure of the authentication operation.

If user installs the authentication module exchange system normally, it proceeds with Step 150 of FIG. 5 and determines whether the authentication module exchange system is installed. The authentication module exchange system itself mentioned above is a system being widely used for authentication in using Internet banking, etc. and thus the specific explanation of the constitution is left out.

After normally checking existence of the authentication module exchange system and determining whether the authentication module exists, if the authentication module does not exist, a process according to the flow chart illustrated in FIG. 7 is performed.

FIG. 7 is a process of verifying whether the authentication module generated in the authentication module generating portion (110) in Step 150 after being converted through the interface portion (310) to perform a role as the authentication module exchange system is installed in the user's PDA, and if not, executing the authentication module. In the above process, in the case that the authentication module is not installed, it verifies whether to connect to WWW (Internet or FTP, etc.) (Step 300) and if not connected, it displays to make user connect to Internet on a screen (Step 302). After completing connection to WWW by user, it determines to be connected to WWW (Step 304) and if the connection is available, it connects to the corresponding site of the authentication server portion (100) (Step 310). In case of failing to connecting to WWW, it can not perform a normal operation with the server portion (100) and thus proceeding with Step 190 of FIG. 5 and displaying an error message on a screen and ending the application.

After connecting to the authentication server portion (100), the virtual unique ID of the user PDA portion (300) is read through the ID checking portion (330). At this time, reading of a virtual unique ID performs a mutual transfer of data by means of the communication portion (220) of the user PC portion (200) performing a bridge in-between.

It verifies whether it has been succeeded in reading a virtual unique ID of the user PDA portion (300) (Step 330) so as to display a system check on an output screen of the user PDA portion (300) or the user PC portion (200) at this step. It can be determined that such situation indicates occurrence of a cracking or system error as a virtual unique ID already should be generated by a previous Step 140 in a usual situation. If the reading fails, it proceeds with Step 190 and outputs an error message to end the application.

In case of succeeding in reading a virtual unique ID, the server portion (100) examines whether a virtual unique ID is registered (Step 340). If not, it proceeds with procedure to perform registration of the application on WWW and thus in case where the registration of the application is not made, the authentication server portion (100) checks whether the application is registered (Step 342). In case of not registering the application, it proceeds with Step 190 to end the application, and in case of registering the application, it undergoes the registration procedure to register the application (Step 344). It verifies whether the application has been registered after the registration and determines if the registration is completed or an error occurs (Step 346). In the case that a problem is generated, it proceeds with Step 190 and handles with the error before ending the application. In the case that there is no problem generated, it proceeds with Step 350 so as to encode the authentication module.

After the virtual unique ID of the user PDA portion (300) has been registered or is normally registered, the server portion (100) encodes the authentication module using the virtual unique ID of the user PDA portion (300) (Step 350). The authentication module as encoded above is transmitted to the interface portion (310) of the user PDA portion (300) through the communication portion (220) of the user PC portion (200) (Step 360).

Finally, it verifies if the encoded authentication module is correctly transmitted through the interface portion (310) of PDA (Step 370). If not correctly transmitted, it proceeds with Step 190 and handles with the error before ending the application in the same manner as described above. Otherwise, if successfully transmitted, it proceeds with Step 160 of FIG. 5 and determines whether the authentication module is for the application or not.

To encode the authentication module by means of the virtual unique ID of the user PDA portion (300) in the server portion (100) (Step 350) is to make the authentication module useless in the user PDA portion (300) having other virtual unique ID and not to make the information of user PC or user which is included in the authentication module utilized, thereby preventing an authentication module from being illegally used.

Information included in an authentication module is largely classified into the following three types; first, information to verify whether decoding is normally completed; second, information that a software manufacturing company wishes to know, i.e., user ID, serial number, usage grade, software level and the like; third, information such as CRC to verify whether information mentioned above is transformed together with the encoded information. At this time, the information form could be a file form or be registered in a region of the registry information and is not always regular such as a hardware-like constituent FIG. 8 is a flow chart illustrating a process of verifying authentication module of an application in FIG. 5. FIG. 8 illustrates a routine performed in the case that an operation of verifying an authentication module of application is performed and the module is not authenticated in Step 160 of FIG. 5. In this regard, that the module is not authenticated means data does not normally come out when decoding and it is not consistent as in the information examination (for example, CRC) of the decoded data. Hence, if not a normal authentication module, it displays a message asking whether to delete an authentication module of the application that is not suitable for illegal use of user (Step 400).

If the authentication module is not deleted, since the authentication module corresponding to the application substantially to be executed is not equipped, it proceeds with Step 190 and displays an error and ends the application. However, if the authentication module is deleted, the corresponding authentication module is deleted (Step 410). After deleting the authentication module, it again proceeds with Step 150 of FIG. 5 and double-checks whether the authentication module exists.

Figure 9:
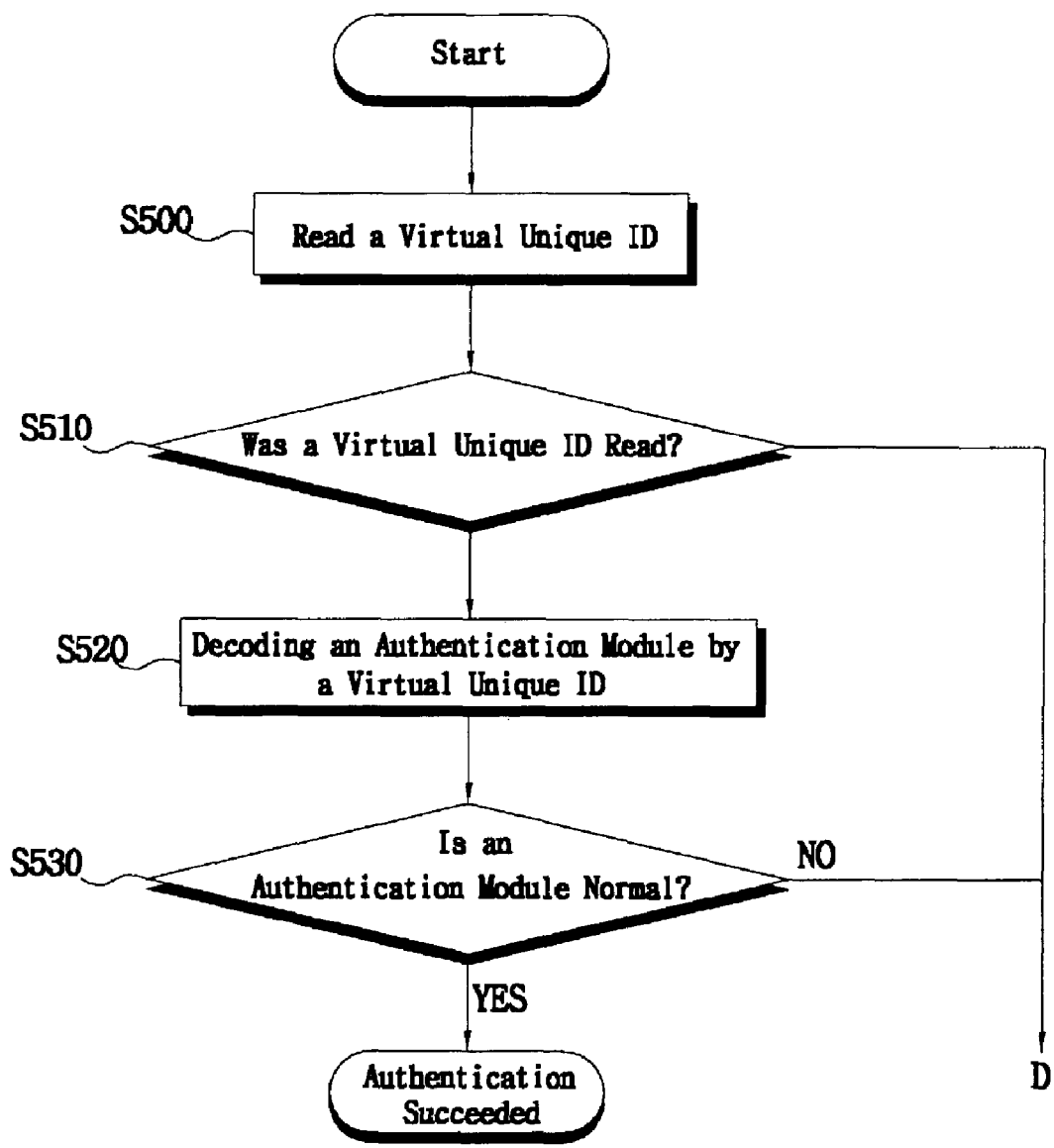
FIG. 9 is a flow chart illustrating a process of decoding an authentication module in the user PDA portion.
Figure 10:
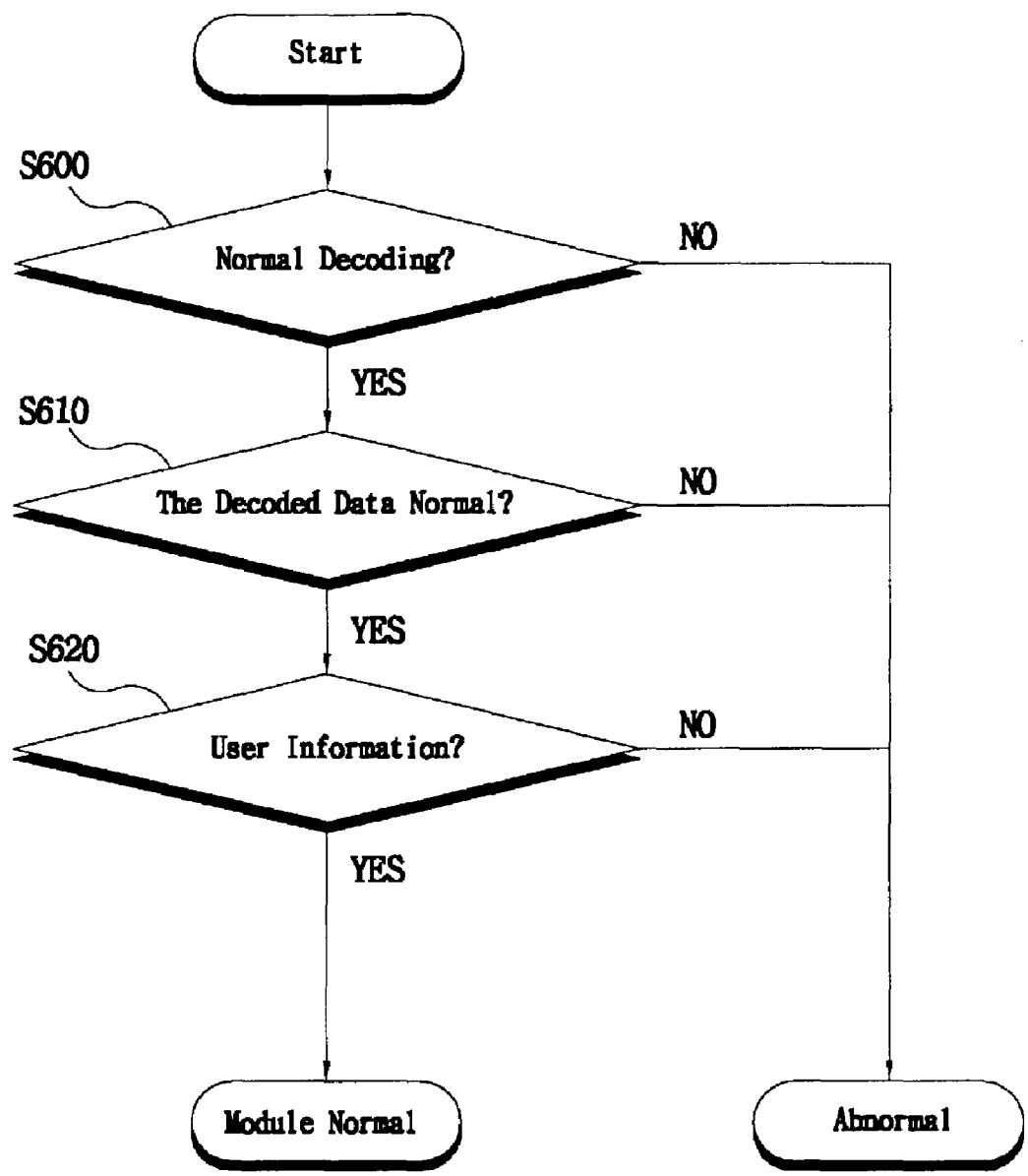
FIG. 10 is a sequence chart explaining a registration process in FIG. 7.

The procedure of examining the authentication module of FIG. 9 is to verify if, in verifying the authentication module of the application of FIG. 5 (Step 160), the authentication module required by the application (350) is normal in the user FDA portion (300). The ID checking portion (330) of the user PDA portion (300) reads a virtual unique ID obtained from the virtual unique ID generating portion (340) as a process for determining whether the encoded authentication module of the authentication module portion (320) is normal (Step 500). In case of failing to read a virtual unique ID, the authentication cannot be performed and thus it proceeds with Step 190 and displays an error and ends the application. However, in case of succeeding in reading a virtual unique ID normally, this virtual unique ID, as a decoding key, makes the authentication module decoded (Step 520).

After the authentication module is decoded, it determines whether the decoded authentication module is normal (Step 530) and if abnormal, it displays error and ends the application. The decoded authentication module is determined based on the order of the flow chart illustrated in FIG. 10. If the authentication module is decoded, it verifies if the decoded module is normally decoded (Step 600). Whether the decoding is normally completed is determined by verifying if there is data (for example, if decoding is normally completed, the first word should be Oxfffb) previously designated for verifying decoding in the decoded data. However, if data for verification does not come out normally, it is regarded as being tried in a PDA having a different virtual unique ID and thus outputs an error message and ends the application.

Next, it verifies whether the decoded data is normal (Step 610). As described regarding information included in the authentication module, it verifies data for verifying information such as CRC to confirm there is no problem in data itself. Such indicates that the decoded data itself has value such as CRC for verifying forgery/alternation of the data and thus calculating the value with the decoded data and determining whether a normal value comes out. If incorrect value is turned out, it is regarded as a data attack like cracking, etc. and displays an error message and ends the application. In the case that it is inconsistent by comparing the user information of PDA with the user information of the authentication module, it is also regarded as information manipulation such as cracking or hacking and is determined as an abnormal module.

Next, it verifies whether the user information (unique key, etc.) of PDA is correct (Step 620). In the case that it is inconsistent by comparing the user information of PDA with the user information of the authentication module, it is regarded as information manipulation like cracking or hacking and is determined as an abnormal module.

If the authentication is normally completed according to the process described above, the application (350) of the user PDA portion (300) is normally performed. However, in a case where an error generated in the inspecting and verifying process of each step, an error message is displayed and the application is ended.

As described above, the present invention generates a virtual unique ID available in PDA using a unique ID based on a personal computer of user regarding the authentication of application being executed in PDA, and performs an authentication operation by such virtual unique ID to prevent the application from being illegally copied or transformed, thereby protecting copyright in a PDA application market. Further, it can prevent instability of system generated due to copy or transformation of a PDA application.

As mentioned above, if using an authentication method according to the present invention, it is possible to install a program by a distribution edition illegally copied when using others' program by a usual illegal copy. However, it is essential to register the application to use and it cannot use the application by the already registered user's information before a right holder assigns his right, resulting in effect of completely preventing illegal copy.

Further, even if an authentication module is copied in a more intellectual manner, a virtual unique ID and ID of the installed device is different each other and thus it can not be used. Data itself coming and going between the server portion and user PDA portion is material which can not be used other than the user PDA and thus a method of intercepting data in-between has strength in an attack.

Although the preferred embodiments according to the present invention are disclosed for illustrative purposes, it will be obvious to those skilled in the art that such embodiments are merely for illustrations but are not restricted to the illustrations themselves, and can be variously changed, transformed and replaced within the scope of the technical idea of the present invention. Further, it should be understood that the technical idea of the present invention is not restricted to the aforementioned embodiments but to only the claims attached hereto and their equivalent technical principle.

What is claimed is:

1. A method for authenticating applications performed on personal digital assistant (PDA), wherein said applications are installed in said personal digital assistant via a personal computer and wherein the registration information of said applications are registered and managed at a server unit connected via internet comprising:

generating a unique ID from information which indicates unique hardware characteristics of the personal computer;

transmitting the unique ID from the personal computer to said PDA;

generating a virtual unique ID from said unique ID by said PDA and authenticating the application at the PDA with said virtual unique ID, wherein said virtual unique ID of said personal digital assistant is generated by transforming a format of said personal computer's unique ID in accordance with personal digital assistant's characteristics, wherein said authentication of said applications is performed through an authentication module including a registration information of said applications, and said authentication module is an encoded one, wherein said authentication module comprises:

a first information for identifying whether said encoded authentication module is decoded correctly in case of decoding said encoded authentication module; and a second information for identifying whether said first information is transformed.

2. The method for authenticating applications performed on PDA according to claim 1, wherein said information indicating hardware characteristics includes at least one of information of a processor, a hard disk and a LAN card of said personal computer.

3. The method for authenticating applications performed on PDA according to claim 1, wherein said authentication module further comprises a third information including at least one of information of an user ID, a serial number, usage grade, a software level which a manufacturer of said application wants.

4. The method for authenticating applications performed on PDA according to claim 1, wherein said decoding of said authentication module is performed by using said virtual unique ID.

5. A method for authenticating applications of PDA, wherein said applications are transmitted to personal digital assistants (user PDA portion) via user's personal computer (user PC portion) and then performed thereon, and registration information of said applications are registered and managed at server unit connected via internet, the method comprising:

if it is determined that an authentication module for authenticating said applications is installed in the PDA portion, decoding said authentication module with a virtual unique ID; and if it is determined that information included in the decoded authentication module is decoded correctly, performing said application, wherein said virtual unique ID is generated by said PDA portion from an unique ID which is transmitted to the user PDA portion, and said unique ID is generated from information indicating hardware characteristics of the user PC portion which is able to specify the user PC portion, wherein if it is determined that information included in the decoded authentication module is not decoded correctly, closing said application, wherein if it is determined that an authentication module for authenticating said applications is not installed in the PDA portion, comprising:

accessing said server unit via said internet;

reading said virtual unique ID from said user PDA portion; and encoding said authentication module with said virtual unique ID as encoding key at said server unit, and transmitting said authentication module to said PDA portion, wherein said authentication module comprises:

a first information for identifying whether said encoded authentication module is decoded correctly in case of decoding said encoded authentication module;

a second information for identifying whether said first information is transformed; and a third information including at least one of information of an user ID, a serial number, usage grade, a software level which a manufacturer of said application wants.

6. The method for authenticating applications of PDA according to claim 5, wherein said virtual unique ID read from said user PDA portion is transmitted from said server unit via said user PC portion.

7. The method for authenticating applications of PDA according to claim 5, wherein said virtual unique ID of said personal digital assistant is generated by transforming said personal computer's unique ID to a predetermined format in accordance with a personal digital assistant's characteristics.

8. A system for authenticating applications of PDA, said applications are transmitted to personal digital assistants (user PDA portion) via user's personal computer (user PC portion) and then performed thereon, and registration information of said applications are registered and managed at server unit connected via internet, wherein said user PC portion comprises:

a unique ID generation portion to generate unique ID from information indicating hardware characteristics to specify the user PC portion; and a communication portion to perform the unique ID transmission to the user PDA portion and data transmission between the server unit and the user PDA portion, and said server unit comprises:

a virtual unique ID management portion to manage virtual unique ID and user information of the PDA portion at which the applications are performed;

authentication module generation portion to generate an authentication module; and authentication module encoding portion to encode the authentication module with virtual unique ID, and said user PDA portion comprises:

an interface portion to perform data communication between user PC portion and the server unit;

a virtual unique ID generation portion to generate virtual unique ID for said user PDA portion from the unique ID received from the user PC portion via the interface means; and an ID determination portion to determine the authenticity of said applications by using information obtained from decoding said encoded authentication module with the virtual unique ID;

wherein said virtual unique ID generation portion generates said virtual unique ID by transforming a format of a unique ID of said user PC portion in accordance with said PDA portion's characteristics;

wherein said authentication module comprises:

a first information to identify whether said encoded authentication module is decoded correctly in case of decoding said encoded authentication module; and a second information to identify whether said first information is transformed.

9. The system for authenticating applications of PDA according to claim 8, wherein said information indicating hardware characteristics includes at least one of information of a processor, a hard disk and a LAN card of said personal computer.

10. The system for authenticating applications of PDA according to claim 8, wherein said authentication module further comprises a third information including at least one of information of a user ID, a serial number, usage grade, a software level which a manufacturer of said application wants.

* * * * *

UNITED STATES PATENT AND TRADEMARK OFFICE
CERTIFICATE OF CORRECTION

PATENT NO.       : 7,594,274 B2
APPLICATION NO.  : 10/374929
DATED            : September 22, 2009
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

Twenty-eighth Day of September, 2010

David J. Kappos
*Director of the United States Patent and Trademark Office*